(12) United States Patent
Madrid

(10) Patent No.: US 12,083,834 B2
(45) Date of Patent: Sep. 10, 2024

(54) TIRE HAVING A CONDUCTIVE PATH IN A SIDEWALL

(71) Applicant: Bridgestone Americas Tire Operations, LLC, Nashville, TN (US)

(72) Inventor: Ruben L. Madrid, Marfa, TX (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 687 days.

(21) Appl. No.: 17/273,131

(22) PCT Filed: Sep. 25, 2019

(86) PCT No.: PCT/US2019/052845
§ 371 (c)(1),
(2) Date: Mar. 3, 2021

(87) PCT Pub. No.: WO2020/072245
PCT Pub. Date: Apr. 9, 2020

(65) Prior Publication Data
US 2021/0323361 A1    Oct. 21, 2021

Related U.S. Application Data

(60) Provisional application No. 62/739,984, filed on Oct. 2, 2018.

(51) Int. Cl.
*B60C 9/18* (2006.01)
*B29D 30/06* (2006.01)
(Continued)

(52) U.S. Cl.
CPC ........ *B60C 19/086* (2013.01); *B29D 30/0681* (2013.01); *B60C 11/005* (2013.01);
(Continued)

(58) Field of Classification Search
CPC ... B60C 19/082; B60C 19/086; B60C 19/088; B60C 11/005; B60C 9/185;
(Continued)

(56) References Cited

U.S. PATENT DOCUMENTS 4,349,061 A * 9/1982 Hirakawa ............. B60C 11/005
152/546
4,842,682 A * 6/1989 Iwata ..................... B29D 30/08
156/124

(Continued)

FOREIGN PATENT DOCUMENTS

| CN | 2889760 | 4/2007 |
| DE | 102006019262 | 10/2007 |

(Continued)

OTHER PUBLICATIONS

Machine translation for Japan 2014-080475 (Year: 2024).*
(Continued)

*Primary Examiner* — Steven D Maki
(74) *Attorney, Agent, or Firm* — Shaun J. Fox; Bryan J. Jaketic

(57) ABSTRACT

A tire includes a circumferential tread disposed in a crown region of the tire and an undertread disposed below the circumferential tread. The tire also has a pair of bead regions, including a first bead region and a second bead region, and a body ply extending from the first bead region to the second bead region. The tire further has a pair of sidewalls, including a first sidewall extending between the first bead region and the circumferential tread and a second sidewall extending between the second bead region and the circumferential tread. The tire also has a sidewall antenna adjacent to the first sidewall. The sidewall antenna has a first end contacting the undertread and a second end contacting the body ply.

20 Claims, 3 Drawing Sheets

(51) Int. Cl.
   *B60C 11/00*   (2006.01)
   *B60C 19/08*   (2006.01)
   *B29D 30/52*   (2006.01)
   *B60C 9/22*    (2006.01)
(52) U.S. Cl.
   CPC .......... *B60C 19/082* (2013.01); *B60C 19/088*
        (2013.01); *B29D 2030/526* (2013.01); *B60C*
        *9/185* (2013.01); *B60C 2009/2219* (2013.01)
(58) Field of Classification Search
   CPC ........ B60C 2009/2219; B29D 30/0681; B29D
                                                  2030/526
   See application file for complete search history.

(56) References Cited

U.S. PATENT DOCUMENTS

| | | | |
|---|---|---|---|
| 6,289,958 | B1 | 9/2001 | Dheur et al. |
| 6,868,878 | B2 | 3/2005 | Janajreh et al. |
| 7,011,125 | B2 | 3/2006 | Zanzig et al. |
| 7,029,544 | B2 | 4/2006 | Lanzarotta et al. |
| 7,284,583 | B2 | 10/2007 | Dheur et al. |
| 7,770,618 | B2 | 8/2010 | Nobuchika et al. |
| 7,819,152 | B2 | 10/2010 | Marriott et al. |
| 8,167,015 | B2 | 5/2012 | Mizutani |
| 8,171,966 | B2 | 5/2012 | Kawakami |
| 8,336,589 | B2 | 12/2012 | Wada et al. |
| 8,353,324 | B2 | 1/2013 | Nakamura |
| 8,376,005 | B2 | 2/2013 | Nakamura |
| 8,424,578 | B2 | 4/2013 | Nakamura |
| 8,869,856 | B2 | 10/2014 | Kunisawa et al. |
| 9,138,953 | B2 | 9/2015 | Kuroki |
| 9,139,051 | B2 | 9/2015 | Kawakami |
| 9,283,817 | B2 | 3/2016 | Sandstrom et al. |
| 9,289,957 | B2 | 3/2016 | Kuroki |
| 9,327,559 | B2 | 5/2016 | Shinkai |
| 9,333,812 | B2 | 5/2016 | Nagai |
| 9,370,909 | B2 | 6/2016 | Kuroki |
| 2006/0096697 | A1 | 5/2006 | Miki |
| 2007/0000585 | A1 | 1/2007 | Uchida et al. |
| 2007/0006957 | A1* | 1/2007 | Nakajima ................ B60C 9/22 |
| | | | 152/533 |
| 2007/0215257 | A1 | 9/2007 | Uchida et al. |
| 2009/0114321 | A1 | 5/2009 | Nakamura |
| 2009/0308512 | A1 | 12/2009 | Nakamura |
| 2010/0132859 | A1 | 6/2010 | Steiner et al. |
| 2010/0243115 | A1* | 9/2010 | Wada .................... B60C 19/08 |
| | | | 152/152.1 |
| 2011/0259489 | A1 | 10/2011 | Queraud et al. |
| 2013/0025752 | A1 | 1/2013 | Aoki et al. |
| 2013/0098516 | A1 | 4/2013 | Kawakami |
| 2013/0133811 | A1 | 5/2013 | Inoue et al. |
| 2013/0180637 | A1 | 7/2013 | Hattori et al. |
| 2014/0283964 | A1 | 9/2014 | Van der Meulen et al. |
| 2014/0326386 | A1 | 11/2014 | Sato |
| 2014/0373990 | A1 | 12/2014 | Kawakami |
| 2015/0083300 | A1* | 3/2015 | Suda .................... B60C 9/1835 |
| | | | 152/532 |
| 2016/0121665 | A1 | 5/2016 | Moldenhauer |
| 2016/0159168 | A1 | 6/2016 | Kishizoe |
| 2017/0291461 | A1 | 10/2017 | Kishizoe |
| 2018/0178595 | A1 | 6/2018 | Svenson et al. |
| 2018/0178596 | A1* | 6/2018 | Kirby ...................... B60C 3/06 |

FOREIGN PATENT DOCUMENTS

| | | | |
|---|---|---|---|
| EP | 1043178 | | 4/2000 |
| EP | 1918132 | | 11/2009 |
| EP | 2520421 | | 7/2012 |
| EP | 2939855 | | 11/2015 |
| EP | 3012095 | | 4/2016 |
| JP | 2004262361 | | 9/2004 |
| JP | 4412565 | | 2/2010 |
| JP | 5027643 | | 9/2012 |
| JP | 2013-184551 | | 9/2013 |
| JP | 2014-080475 | A * | 5/2014 |
| JP | 2014213747 | | 11/2014 |
| JP | 2015013633 | | 1/2015 |
| JP | 2015189282 | | 11/2015 |
| JP | 5924985 | | 5/2016 |
| KR | 20100006628 | | 1/2010 |
| KR | 10-2017-0083735 | | 7/2017 |
| WO | 2008038463 | | 4/2008 |
| WO | 2015149957 | | 10/2015 |

OTHER PUBLICATIONS

Written Opinion and international search report; Corresponding PCT application PCT/US2019/052845: Authorized officer Hwang, Chan Yoon: Date of mailing Jan. 16, 2020.
European Search Report; Corresponding EP Application No. 19869083; May 20, 2022.

* cited by examiner

TIRE HAVING A CONDUCTIVE PATH IN A SIDEWALL

FIELD OF INVENTION

The present disclosure is directed to tires having conductivity paths for conducting electric charge. More particularly, the present disclosure is directed to tires having a conductive path in a sidewall region.

BACKGROUND

Known tires contain materials that inhibit the conduction of electric charge. For example, tires having relatively high amounts of silica are known to accumulate static charge, which is undesirable for vehicle operation. Tires having relatively high amounts of silica previously used tread antennas to dissipate charge.

SUMMARY OF THE INVENTION

In one embodiment, a tire includes a first annular bead, a second annular bead, and a first abrasion area disposed about the first annular bead. The first abrasion area has a resistivity of at least $10^5$ ohm-cm. The tire also has a body ply extending between the first annular bead and the second annular bead and a circumferential belt disposed radially upward of the body ply and extending axially across a portion of the body ply. The tire further includes at least one cap ply disposed radially upward of the circumferential belt and extending axially across a portion of the body ply. The at least one cap ply has a resistivity of at least $1\times10^6$ ohm-cm. The tire also includes a circumferential tread disposed radially upward of the circumferential belt and extending axially across a portion of the body ply. The circumferential tread has a resistivity of at least $10^8$ ohm-cm. The tire further has a circumferential undertread disposed radially upward of the circumferential belt and radially below the circumferential tread, which extends axially across a portion of the body ply. The circumferential undertread has a resistivity between $10^5$ ohm-cm and $10^9$ ohm-cm. The tire also has a first sidewall extending between the first annular bead and a first shoulder that is associated with the circumferential tread. The first sidewall has a resistivity of at least $10^6$ ohm-cm. The tire further includes a second sidewall extending between the second annular bead and a second shoulder that is associated with the circumferential tread. The tire also includes a belt edge insert disposed at an axially outer edge of the circumferential belt, and associated with the body ply and the first shoulder. The tire further has a continuous tread antenna disposed in the circumferential tread, which extends from a radially upper surface of the circumferential tread to the circumferential undertread and has a resistivity of at least $10^5$ ohm-cm. The tire also has a continuous sidewall antenna disposed between the belt edge insert and the first sidewall, which extends from the circumferential undertread to the body ply and has a resistivity of at least $10^5$ ohm-cm.

In another embodiment, a method of making a tire includes providing a pair of bead regions including a first bead region and a second bead region, and extending a body ply from the first bead region to the second bead region. The method further includes providing a first and second sidewall compound, providing a sidewall antenna compound, and providing a first and second belt edge insert compound. The method also includes assembling a first sidewall assembly by placing the sidewall antenna compound between the first sidewall compound and the first belt edge insert compound. The method further includes extending the first sidewall assembly from the first bead region to a crown region. The method also includes assembling a second sidewall assembly of the second sidewall compound and the second belt edge insert compound and extending the second sidewall assembly from the second bead region to the crown region. The method further includes placing a belt above the body ply, such that a first end of the belt is above the first belt edge insert compound of the first sidewall assembly and a second end of the belt is above the second belt edge insert compound of the second sidewall assembly. The method also includes placing an undertread above the belt, such that the undertread contacts the sidewall antenna compound of the first sidewall assembly, and placing a tread above the undertread.

In yet another embodiment, a tire includes a circumferential tread disposed in a crown region of the tire and an undertread disposed below the circumferential tread. The tire also has a pair of bead regions, including a first bead region and a second bead region, and a body ply extending from the first bead region to the second bead region. The tire further has a pair of sidewalls, including a first sidewall extending between the first bead region and the circumferential tread and a second sidewall extending between the second bead region and the circumferential tread. The tire also has a sidewall antenna adjacent to the first sidewall. The sidewall antenna has a first end contacting the undertread and a second end contacting the body ply.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and normal load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1:
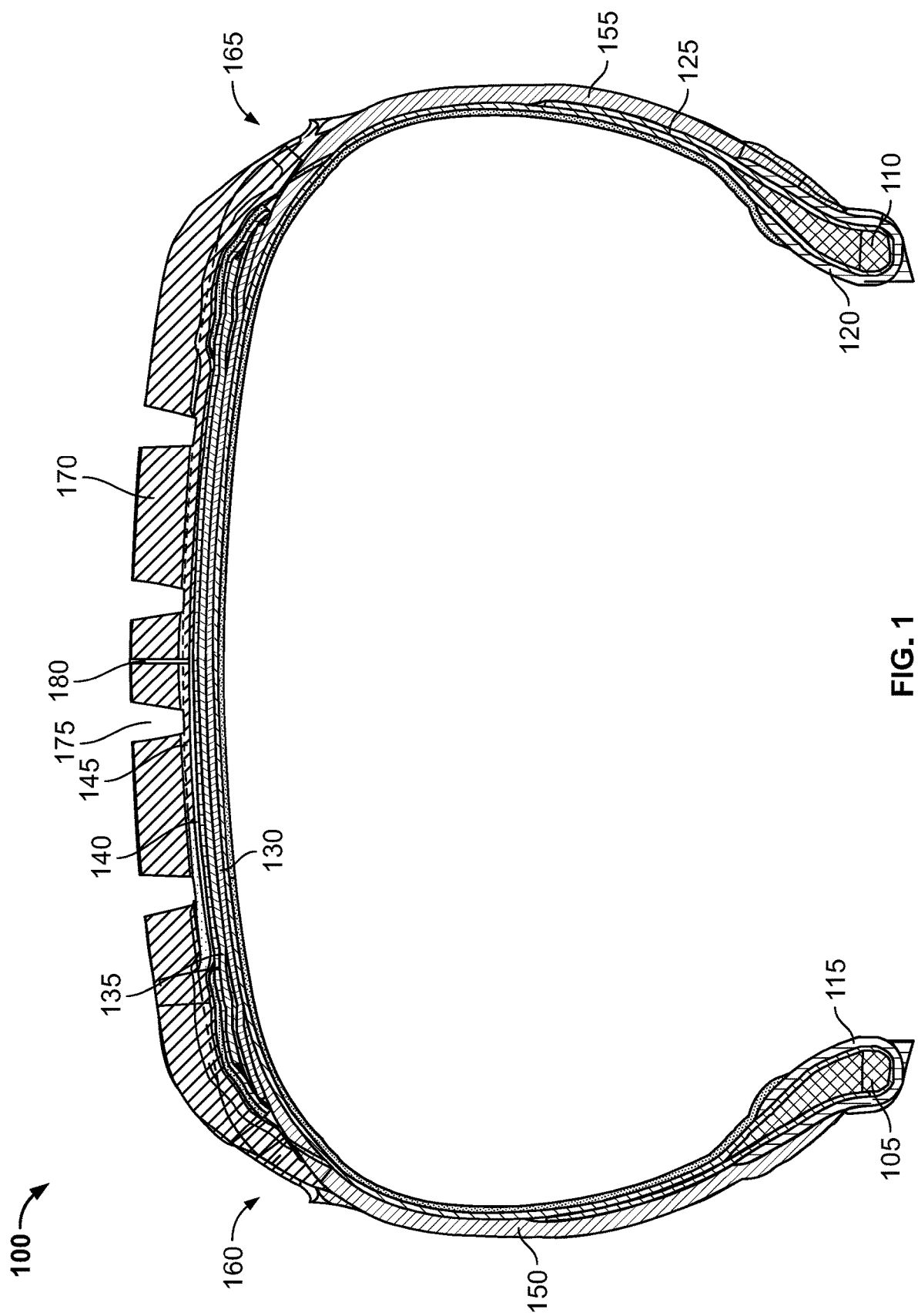
FIG. 1 is a cross-sectional view of a half section of one embodiment of a tire having a conductive path in a sidewall region.

FIG. 1 is a cross-sectional view of a half section of one embodiment of a tire 100 having a conductive path in a sidewall region. Tire 100 includes a first annular bead 105 and a second annular bead 110. In an alternative embodiment (not shown), the tire comprises four or more beads.

The first annular bead 105 is surrounded by a first abrasion 115, and the second annular bead is surrounded by a second abrasion 120. The annular beads 105, 110, in part, secure the tire to a wheel, with the abrasions 115, 120 in direct contact with the wheel. In this regard, each bead is an annular structure that is configured to interface with a wheel (and in particular, the wheel rim).

In one embodiment, the first and second abrasions 115, 120 each have a resistivity of at least $1.03 \times 10^6$ ohm-cm. In an alternative embodiment, the first and second abrasions 115, 120 each have a resistivity of at least $10^5$ ohm-cm. In another alternative embodiment, the tire can have a single abrasion having a resistivity of at least $10^5$ ohm-cm.

The tire 100 further includes a body ply 125, which imparts shape to the tire, extending between first annular bead 105 and second annular bead 110. The body ply 125 extends around the first annular bead 105 and the second annular bead 110. In the illustrated embodiment, turn-up portions of the body ply 125 terminate in the sidewall regions of the tire. In alternative embodiments, turn-up portions of the body ply may terminate in the bead regions or crown regions of the tire.

As one of ordinary skill in the art will understand, body ply 125 may contain reinforcing cords or fabric (not shown) in a skim material. In one particular embodiment, the body ply does not contain steel (e.g., any reinforcement cords in the body ply lack steel). In an alternative embodiment (not shown), multiple body plies are utilized. While FIG. 1 illustrates a single body ply 125, in alternative embodiments two or more body plies may be employed.

In one embodiment, the body ply skim 125 has a resistivity of at least $3.67 \times 10^8$ ohm-cm. In an alternative embodiment, the body ply skim 125 has a resistivity between $10^5$ ohm-cm and $10^{14}$ ohm-cm.

A first circumferential belt 130 and a second circumferential belt 135 are disposed radially upward of body ply 125 and extend axially across a portion of body ply 125 in a crown region of the tire 100. As one of ordinary skill in the art will understand, first circumferential belt 130 and second circumferential belt 135 may contain steel cords and reinforcing cords (both not shown). In an alternative embodiment (not shown), a three or more circumferential belts are provided. In another alternative embodiment (not shown), a single circumferential belt is employed. In one alternative embodiment, the circumferential belts lack metal.

In the illustrated embodiment, a cap ply 140 is disposed radially upward of first circumferential belt 130 and second circumferential belt 135. The cap ply 140 includes cords, such as nylon cords, in a skim material. Cap ply 140 extends axially across a portion of body ply 125 in a crown region of the tire 100. In an alternative embodiment (not shown), the tire includes two or more cap plies. In another embodiment, the cap ply may be omitted. In one embodiment in which the cap ply is omitted, an additional layer may be employed that covers the belt edges without traversing the entire width of the belts. In another alternative embodiment, a sealing gel layer is provided in the cap ply region.

In one embodiment, the cap ply 140 and skim has a resistivity of at least $1.3 \times 10^8$ ohm-cm. In an alternative embodiment, the cap ply 140 and skim has a resistivity of at least $1 \times 10^6$ ohm-cm.

The tire 100 also includes an undertread 145 disposed radially upward of the circumferential belts 130 and 135 and the cap ply 140. The undertread 145 extends axially across a portion of body ply 125 in a crown region of the tire 100. An undertread is typically constructed of rubber, and its thickness may vary depending on the tire application. For instance, in retreading applications, a thicker undertread is desired to accommodate buffing. In passenger tire applications, by comparison, a thinner undertread may be desired. In one known embodiment, the undertread has a thickness of 0.51 mm. However, it should be understood that an undertread of any thickness might be employed.

In one embodiment, the undertread 145 has a resistivity of at least $9.02 \times 10^7$ ohm-cm. In an alternative embodiment, the undertread 145 has a resistivity between $1 \times 10^5$ ohm-cm and $1 \times 10^9$ ohm-cm.

The tire 100 further includes a first sidewall 150 and a second sidewall 155. The first sidewall 150 extends between the first annular bead 105 and a first shoulder 160, which is proximately associated with an edge of circumferential tread 170. The second sidewall 155 extends between the second annular bead 110 and a second shoulder 165, which is proximately associated with the opposite edge of circumferential tread 170.

In one embodiment, the first and second sidewalls 150, 155 each have a resistivity of at least $1.12 \times 10^{12}$ ohm-cm. In an alternative embodiment, the first and second sidewalls 150, 155 each have a resistivity of at least $10^6$ ohm-cm.

The tire 100 further includes a circumferential tread 170, which as one of ordinary skill in the art will understand, is disposed in the crown region of the tire. In the illustrated embodiment, the circumferential tread 170 is separated by circumferential grooves 175, which divide circumferential tread 170 into five ribs. However, it should be understood that the circumferential tread may include any combination of grooves, ribs, block, lugs, or other tread elements. In most applications, the circumferential tread is affixed to the tire when the tire is new. In an alternative embodiment, the circumferential tread is affixed as a retread.

In one embodiment, the tread 170 has a resistivity of at least $10^8$ ohm-cm.

Tire 100 further includes a tread antenna 180. The tread antenna 180 is constructed of conductive material that allows charge to dissipate from the tire to the ground. Exemplary materials include, without limitation, rubber with a low resistivity of at least $1 \times 10^5$ ohm-cm. The tread antenna 180 is a continuous, circumferential antenna. In an alternative embodiment, a plurality of tread antennae are employed, with each tread antenna extending only partially in a circumferential direction.

In one embodiment, the tread antenna 180 has a resistivity between $10^5$ ohm-cm and $10^6$ ohm-cm. In an alternative embodiment, the tread antenna 180 has a resistivity of at least $10^5$ ohm-cm. The resistivity of the tread antenna may be adjusted by using different compounds.

Figure 2:
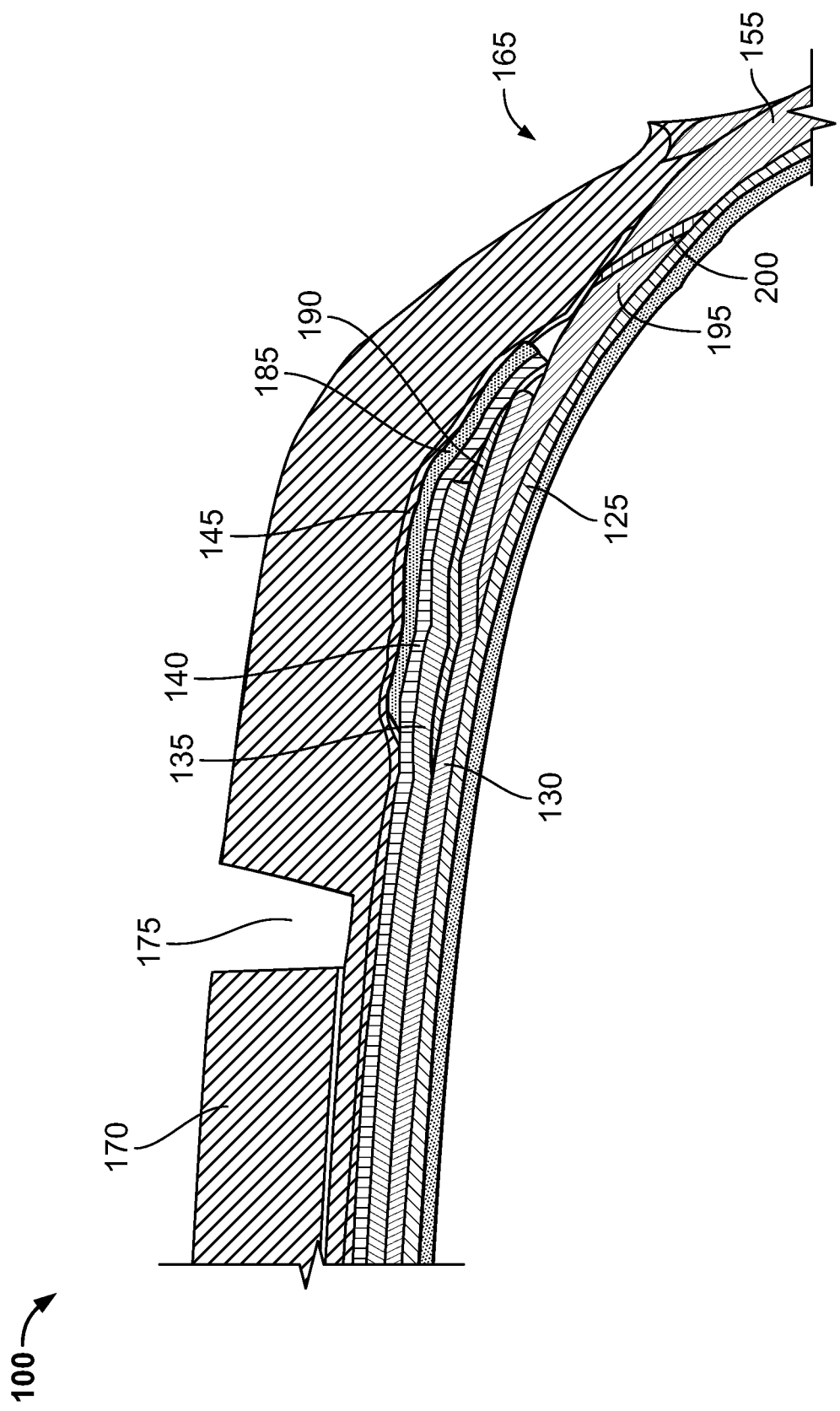
FIG. 2 is a close-up view of FIG. 1.

FIG. 2 is a close-up view of FIG. 1, showing additional detail in the tread and second shoulder region 165. As can be seen in this view, the tire 100 further includes a shoulder insert 185 in the second shoulder region 165. The shoulder insert 185 is disposed between the cap ply 140 and the undertread 145, in the region directly above the ends of the first and second belts 130, 135. The shoulder insert 185 may be constructed of polyester, nylon, or other material. The shoulder insert 185 is a cap ply strip that does not cover entire width of belts, and may be referred to simply as a layer. A similar shoulder insert is disposed in the first shoulder region 160. In an alternative embodiment, only a single shoulder insert is employed. In another alternative embodiment, the shoulder insert may be omitted entirely.

The tire 100 also includes an upper belt edge insert 190 in the second shoulder region 165. The upper belt edge insert 190 is disposed between the first belt 130 and the second belt 135 and is directly under an edge of the second belt 135. The upper belt edge insert 190 may be constructed of rubber. The upper belt edge insert 190 is used to protect against shear force causing separations in the belt edge region, and may also be referred to as a "wedge." A similar upper belt edge insert is disposed in the first shoulder region 160. In an alternative embodiment, only a single upper belt edge insert is employed. The gauge of the upper belt edge insert may vary between 0.5-2 mm.

The tire 100 further includes a lower belt edge insert 195 in the second shoulder region 165. The lower belt edge insert 195 is disposed between the body ply 125 and the first belt 130 and is directly under an edge of the first belt 130. The lower belt edge insert 195 may be constructed of rubber. The lower belt edge insert 195 protects the belts from being pulled through lower body ply. A similar lower belt edge insert is disposed in the first shoulder region 160. In an alternative embodiment, only a single lower belt edge insert is employed. In another alternative embodiment, the lower belt edge insert may be omitted entirely.

Additionally, a sidewall antenna 200 is disposed between the lower belt edge insert 195 and the second sidewall 155. The sidewall antenna 200 extends from the undertread 145 to the body ply 125. The sidewall antenna 200 is constructed of conductive material that allows charge to travel between the undertread 145 to the body ply skim 125. Exemplary conductive materials include, without limitation, rubber material with low resistivity. In one embodiment, the sidewall antenna 200 is constructed of the same material as the tread antenna 180. In an alternative embodiment, the sidewall antenna 200 is constructed of a different material from that of the tread antenna 180.

The sidewall antenna 200 is a continuous, circumferential antenna. In an alternative embodiment, a plurality of sidewall antennae are employed, with each sidewall antenna extending only partially in a circumferential direction.

A top end of the sidewall antenna 200 is axially spaced from the ends of the first belt 130 and the second belt 135. The top end of the sidewall antenna 200 is also axially spaced from the ends of the cap ply 140, the shoulder insert 185, and the upper belt edge insert 190. Although it is referred to as a "sidewall" antenna, the sidewall antenna 200 may be located in a shoulder region of the tire. In the illustrated embodiment, a sidewall antenna 200 is disposed on each side of the tire. In an alternative embodiment, a sidewall antenna 200 is only disposed on one side of the tire.

In one embodiment, the sidewall antenna 200 has a resistivity between $10^6$ ohm-cm and $10^7$ ohm-cm. In an alternative embodiment, the sidewall antenna 200 has a resistivity of at least $10^5$ ohm-cm.

In tire 100, an electric charge travels from the beads 105, 110 and abrasions 115, 120 through the body ply 125. The charge then travels from the body ply 125 through the sidewall antenna 200 to the undertread 145. The charge then dissipates from the undertread 145 through the tread antenna 180 to the ground. It should be understood, however, that the electric charge may travel through other paths.

Figure 3:
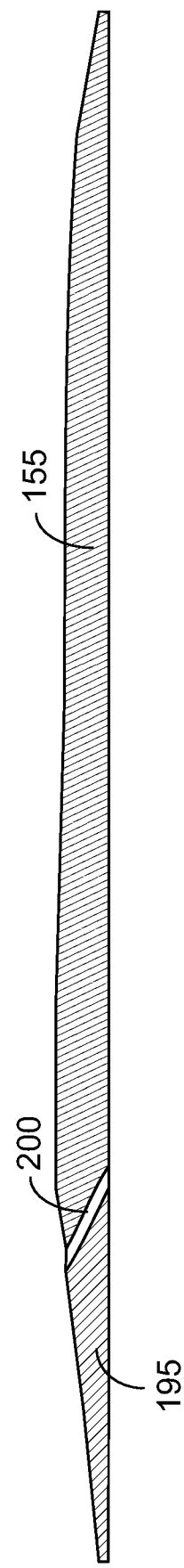
FIG. 3 is a cross-sectional view of one embodiment of a sidewall and belt edge component for a tire.

FIG. 3 is a cross-sectional view of one embodiment of a sidewall 155, sidewall antenna 200, and belt edge insert 195 prior to assembly in a green tire. The sidewall 155, sidewall antenna 200, and belt edge insert 195 may be formed into a single component by calendering process. For example, the sidewall rubber, sidewall antenna, and belt edge insert may be formed separately and then calendered together. Alternatively, the sidewall, sidewall antenna, and belt edge insert component may be formed by an extrusion process.

In one embodiment, a method of making a tire, such as the tire 100, includes providing a pair of bead regions including a first bead region and a second bead region. A body ply is then extended from the first bead region to the second bead region. Sidewall compound, sidewall antenna compound, and belt edge insert compound are all provided.

The method further includes assembling a first sidewall assembly having the sidewall antenna compound disposed between the sidewall compound and the belt edge insert compound, then extending the first sidewall assembly from the first bead region to a crown region. The method also includes assembling a second sidewall assembly having the sidewall compound and the belt edge insert compound, and extending the second sidewall assembly from the second bead region to a crown region.

The method further includes placing a belt above the body ply, such that a first end of the belt is above the belt edge insert of the first sidewall assembly and a second end of the belt is above the belt edge insert of the second sidewall assembly. An undertread is then placed above the belt, such that the undertread contacts the tread antenna compound of the first sidewall assembly. A tread is placed above the undertread.

The assembling of the second sidewall assembly may also include providing sidewall antenna compound between sidewall compound and belt edge insert compound. Additionally, the placing of the undertread above the belt may include placing the undertread above the belt such that the undertread contacts the sidewall antenna compound of the second sidewall assembly.

In one embodiment, the method also includes forming the tread such that the tread has a tread antenna disposed therein. In such an embodiment, the tread is placed on the undertread such that the tread antenna contacts the undertread.

As one of ordinary skill in the art would understand, the tire embodiments described in this disclosure may be configured for use on a vehicle selected from the group consisting of motorcycles, tractors, agricultural vehicles, lawnmowers, golf carts, scooters, airplanes, military vehicles, passenger vehicles, hybrid vehicles, high-performance vehicles, sport-utility vehicles, light trucks, heavy trucks, heavy-duty vehicles, and buses. One of ordinary skill in the art would also understand that the embodiments described in this disclosure may be utilized with a variety of tread patterns, including, without limitation, symmetrical, asymmetrical, directional, studded, and stud-less tread patterns. One of ordinary skill in the art would also understand that the embodiments described in this disclosure may be utilized, without limitation, in high-performance, winter, all-season, touring, non-pneumatic, and retread tire applications.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
a circumferential tread disposed in a crown region of the tire;
an undertread disposed below the circumferential tread;
a circumferential belt disposed below the undertread, wherein the circumferential belt includes a first belt and a second belt above the first belt;
a pair of lower belt edge inserts disposed below the first belt, the pair of lower belt edge inserts including a first lower belt edge insert and a second lower belt edge insert;
a pair of bead regions, including a first bead region and a second bead region;
a body ply extending from the first bead region to the second bead region;
a pair of sidewalls, including a first sidewall extending between the first bead region and the circumferential tread and a second sidewall extending between the second bead region and the circumferential tread; and
a sidewall antenna between the first lower belt edge insert and the first sidewall, wherein the sidewall antenna has a first end contacting the undertread and a second end contacting the body ply,
wherein the sidewall antenna is a strip, and
wherein, in a cross-section of the tire, the sidewall antenna has a thickness being between the lower belt edge insert and the first sidewall, and being substantially constant from the first end to the second end.

2. The tire of claim 1, wherein the sidewall antenna has a resistivity of at least $10^5$ ohm-cm.

3. The tire of claim 1, further comprising a second sidewall antenna between the second lower belt edge insert and the second sidewall, wherein the second sidewall antenna has a first end contacting the undertread and a second end contacting the body ply.

4. The tire of claim 1, further comprising a tread antenna disposed in the circumferential tread.

5. The tire of claim 4, wherein the tread antenna contacts the undertread.

6. A tire comprising:
a first annular bead and a second annular bead;
a first abrasion area disposed about the first annular bead, wherein the first abrasion area has a resistivity of at least $10^5$ ohm-cm;
a body ply extending between the first annular bead and the second annular bead;
a circumferential belt disposed radially upward of the body ply and extending axially across a portion of the body ply, wherein the circumferential belt includes a first belt and a second belt above the first belt;
at least one cap ply disposed radially upward of the circumferential belt and extending axially across a portion of the body ply, wherein the at least one cap ply has a resistivity of at least $1 \times 10^6$ ohm-cm;
a circumferential tread disposed radially upward of the circumferential belt and extending axially across a portion of the body ply, wherein the circumferential tread has a resistivity of at least $10^8$ ohm-cm;
a circumferential undertread disposed radially upward of the circumferential belt and radially below the circumferential tread, which extends axially across a portion of the body ply, wherein the circumferential undertread has a resistivity between $10^5$ ohm-cm and $10^9$ ohm-cm;
a first sidewall extending between the first annular bead and a first shoulder, the first shoulder being associated with the circumferential tread, wherein the first sidewall has a resistivity of at least $10^6$ ohm-cm;
a second sidewall extending between the second annular bead and a second shoulder, the second shoulder being associated with the circumferential tread;
a lower belt edge insert disposed at an axially outer edge of the circumferential belt, and being associated with the body ply and the first shoulder;
a continuous tread antenna disposed in the circumferential tread, which extends from a radially upper surface of the circumferential tread to the circumferential undertread and has a resistivity of at least $10^5$ ohm-cm;
a continuous sidewall antenna disposed between the lower belt edge insert and the first sidewall, which extends from the circumferential undertread to the body ply and has a resistivity of at least $10^5$ ohm-cm, wherein the continuous sidewall antenna is a strip having a first end contacting the circumferential undertread and a second end contacting the body ply, and wherein, in a cross-section of the tire, the continuous sidewall antenna has a thickness being between the lower belt edge insert and the first sidewall, and being substantially constant from the first end to the second end.

7. The tire of claim 6, wherein a top of the continuous sidewall antenna is axially spaced from an end of the circumferential belt.

8. The tire of claim 6, wherein a top of the continuous sidewall antenna is axially spaced from an end of the at least one cap ply.

9. The tire of claim 6, wherein the continuous sidewall antenna is located in a shoulder region of the tire.

10. The tire of claim 6, further comprising:
a first upper belt edge insert disposed between the first belt and the second belt and directly under a first edge of the second belt;
a second upper belt edge insert disposed between the first belt and the second belt and directly under a second edge of the second belt;
a second lower belt edge insert disposed at an axially outer edge of the circumferential belt, and being associated with the body ply and the second shoulder.

11. The tire of claim 10, further comprising a second continuous sidewall antenna, disposed between the second lower belt edge insert and the second sidewall, which extends from the circumferential undertread to the body ply and has a resistivity of at least $10^5$ ohm-cm.

12. The tire of claim 6, further comprising a shoulder insert in the shoulder region disposed between the at least one cap ply and the circumferential undertread.

13. A method of making a tire, the method comprising:
providing a pair of bead regions including a first bead region and a second bead region;
extending a body ply from the first bead region to the second bead region;
providing a first and second sidewall compound;
providing a sidewall antenna compound,
    wherein the sidewall antenna compound is in the form of a strip, and
    wherein, in a cross-section of the tire, the sidewall antenna compound has a thickness that is substantially constant from a first end to a second end;
providing a first and second lower belt edge insert compound;
assembling a first sidewall assembly by placing the sidewall antenna compound between the first sidewall compound and the first lower belt edge insert compound;
extending the first sidewall assembly from the first bead region to a crown region, such that the second end of the sidewall antenna compound contacts the body ply;
assembling a second sidewall assembly of the second sidewall compound and the second lower belt edge insert compound;
extending the second sidewall assembly from the second bead region to the crown region;
placing a first belt above the body ply, such that a first end of the first belt is above the first lower belt edge insert compound of the first sidewall assembly and a second end of the first belt is above the second lower belt edge insert compound of the second sidewall assembly;
placing a first upper belt edge insert on the first end of the first belt;
placing a second upper belt edge insert on the second end of the first belt;
placing a second belt on the first belt, such that a first end of the second belt is directly above the first upper belt edge insert and such that a second end of the second belt is directly above the second upper belt edge insert;
placing an undertread above the second belt, such that the undertread contacts the first end of the sidewall antenna compound of the first sidewall assembly; and
placing a tread above the undertread.

14. The method of claim 13, wherein the assembling the second sidewall assembly includes providing a second sidewall antenna compound between the second sidewall compound and the second lower belt edge insert compound.

15. The method of claim 14, wherein the placing the undertread above the second belt, includes placing the undertread above the second belt such that the undertread contacts the second sidewall antenna compound of the second sidewall assembly.

16. The method of claim 13, further comprising forming the tread such that the tread has a tread antenna disposed therein.

17. The method of claim 16, wherein the tread is placed on the undertread such that the tread antenna contacts the undertread.

18. The method of claim 13, wherein the assembling the first sidewall assembly includes calendering the first sidewall compound, the sidewall antenna compound, and the first lower belt edge insert compound.

19. The method of claim 13, wherein the assembling the first sidewall assembly includes extruding the first sidewall compound, the sidewall antenna compound, and the first lower belt edge insert compound.

20. The method of claim 13, wherein the sidewall antenna compound has a resistivity of at least $10^5$ ohm-cm.

* * * * *